E. W. DAVIS.
CUSHIONED VEHICLE AXLE.
APPLICATION FILED AUG. 29, 1910.
1,113,202.
Patented Oct. 13, 1914.
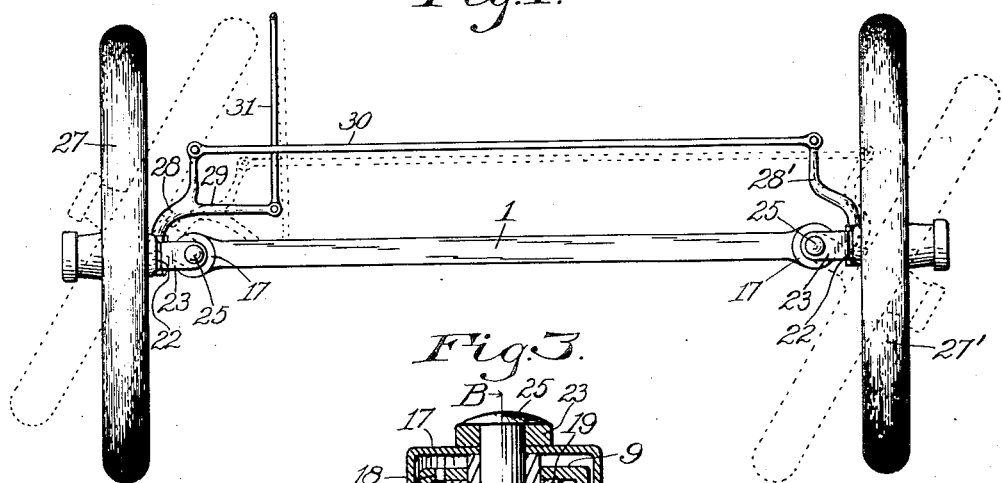
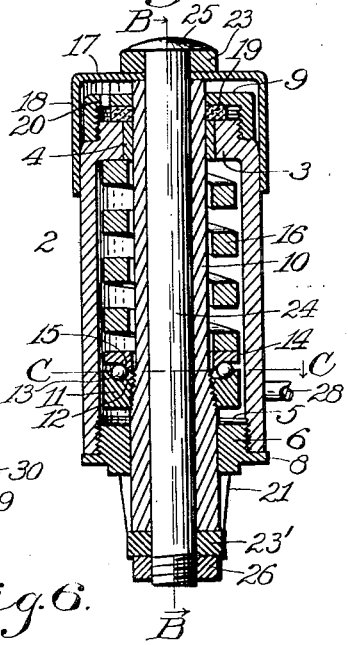
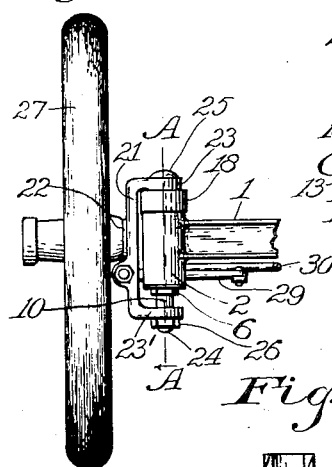
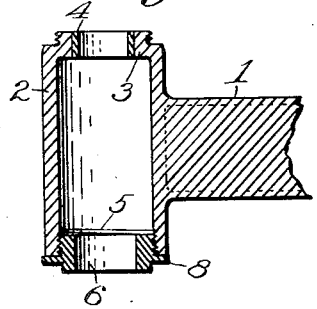
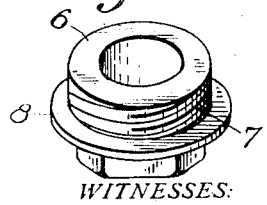
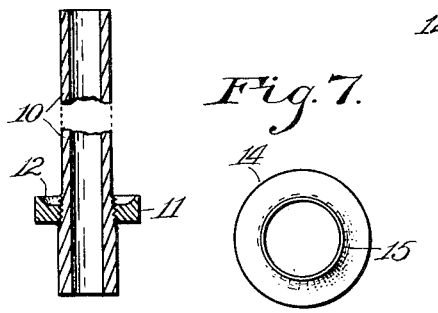
WITNESSES:
J. H. Gardner
E. M. Russell
INVENTOR:
Edward W. Davis,
BY E. T. Silvius,
ATTORNEY.

UNITED STATES PATENT OFFICE.

EDWARD W. DAVIS, OF INDIANAPOLIS, INDIANA.

CUSHIONED VEHICLE-AXLE.

1,113,202.   Specification of Letters Patent.   Patented Oct. 13, 1914.

Application filed August 29, 1910. Serial No.579,517.

*To all whom it may concern:*

Be it known that I, EDWARD W. DAVIS, a citizen of the United States, residing at Indianapolis, in the county of Marion and State of Indiana, have invented certain new and useful Improvements in Cushioned Vehicle-Axles; and I do declare the following to be a full, clear, and exact description of the invention, reference being had to the accompanying drawings, and to the letters and figures of reference marked thereon, which form a part of this specification.

This invention relates to the type of vehicles that is adapted to be used on highways or streets, the invention having reference more particularly to automobiles or similar vehicles and especially to the steering axle thereof, and means for permitting the wheels to rise or fall with respect to the main portion of the axle to which the vehicle body or its spring is directly connected.

The object of the invention is to provide an improved cushioned vehicle axle that will be adapted to afford easy riding and obviate liability of bending axles when running over rough roads, especially at high speeds, a further object being to provide a strong and reliable cushioned steering axle that will be adapted to be cheaply constructed, and be durable and economical in use and operate to avoid bursting pneumatic tires when striking obstructions, such as ruts or stones in the roadway.

The invention comprises a main axle bar having stub-axles pivoted thereto and provided with improved cushions permitting the stub-axle to move vertically with respect to the main axle-bar; the invention consisting also in the novel parts and combinations and arrangements of parts as hereinafter particularly described and claimed.

Referring to the drawings, Figure 1 is a top plan of an automobile steering axle constructed in accordance with the invention and having wheels thereon; Fig. 2, a fragmentary front elevation; Fig. 3, a vertical section on the line A A in Fig. 2 omitting the wheel; Fig. 4, a fragmentary section on the plane of the line B B in Fig. 3; Fig. 5, a perspective view of one of the parts of the cushion which serves as a housing of the cushion which serves as a bearing for the steering pivot; Fig. 6, a fragmentary section of a part of the pivot as on the plane of the line A A in Fig. 2; Fig. 7, an inverted plan of one of the parts of a ball bearing for the cushion; and, Fig. 8, a horizontal section on the line C C in Fig. 3, omitting some of the bearing balls.

Similar reference characters throughout the various figures of the drawings indicate corresponding elements or features of construction herein referred to.

In the drawings the numeral 1 indicates a main axle-bar which may be variously shaped, and each of its two ends has a vertical housing 2 thereon which is cylindrical with an open lower end, the upper end having an integral centrally-apertured head 3 in which preferably a bushing 4 is inserted fixedly to constitute a pivot bearing. The lower end portion of the housing has internal screw-threads 5 whereby a bushing 6 having external screw-threads 7 is removably secured in the housing, the bushing preferably having a flange 8 thereon seated against the lower end of the housing. A centrally apertured cap 9 is secured on the head 3 of the housing and it comprises an oil-box, there being sufficient space between the top head 3 and the cap to retain lubricating oil or grease. A sleeve 10 is provided which is somewhat longer than the housing and is fitted so as to rotate in the bushings 4 and 6 and so as to move vertically therein, the sleeve having a collar 11 secured thereto somewhat removed from its lower end and so as to be somewhat above the bushing 6; the upper side of the collar having a ball-race 12 therein so as to constitute a ball retaining cup in which a suitable number of bearing-balls 13 are placed which support an annular cone 14 having a ball-race 15 in its under side. A coil-spring 16 of suitable length is placed within the housing and extends about the sleeve, its lower end being seated upon the cone 14, the head 3 of the housing being seated upon the upper end of the coil-spring, so that as will be seen the main axle-bar is supported upon two springs. A dust-cap is provided which comprises a perforated plate 17 that rests upon the top of the sleeve 10 and a relatively long flange 18 that extends about and downward beyond the cap 9 in movable contact with the exterior of the housing 2, the plate and the flange excluding dust from the sleeve and its oil-box and upper bearing. Suitable packing 19 is placed about the sleeve 10 under the cap 9 for absorbing and feeding the lubricant to the sleeve and its bearing, the cap 9 preferably having an oil-hole 20 in its top. A stub-axle 21 has a hub 22 thereon as usual and also two opposing pivot ears 23 and 23' which are somewhat farther apart than the space between the top and bottom of the housing externally, so that the housing may move vertically between the ears, the ears being suitably spaced apart to neatly receive the sleeve 10 with the plate 17 thereon between them, and a pivot-pin 24 is inserted in the sleeve and extends through it and also through the ears and has a head 25 thereon which is seated upon the upper ear 23, a nut 26 being placed on its lower end against the lower ears 23' for retaining the pivot-pin, the latter preferably being thereby secured to the pivot ears and binding the pivot-ears to the sleeve, so that the load is carried jointly by the two ears, and the pivot-pin and the sleeve rotate together during steering operations. Suitable wheels 27 and 27' are mounted as usual on the pivoted stub-axles and are controlled as usual by means of arms 28 and 28' with which the stub-axles are provided, one arm having a branch 29 thereon, the arms being coupled by means of a rod 30 as usual and the branch being in connection with a controlling rod 31 which may be operated in any desired manner, as will be understood.

In practical use when the wheels roll into the depressions suddenly, the spring 16 expands so as to prevent the housing from descending suddenly, and again as the wheel rises from the depression or runs over a stone or obstacle, the spring becomes compressed somewhat before forcing up the housing, so that the main axle-bar 1 is not liable to be bent and the shocks are thus absorbed by the springs.

Having thus described the invention what is claimed as new, is—

1. A cushioned axle including an axle-bar having two cylindrical housings thereon, each housing having an apertured head on its upper end and a bushing in its lower end, an annular bearing secured fixedly in the apertured head, a sleeve movable longitudinally and rotatively in the bearing and the bushing and having a collar thereon, bearing balls on the collar, an annular cone supported on the balls, a spring supported on the cone and supporting the apertured head, a stub-axle having an ear extending opposite one end of the sleeve and an ear extending opposite the opposite end of the sleeve, and a pivot pin extending through the sleeve and the ears and secured fixedly to both the ears.

2. A cushioned axle including a main axle-bar having two housings thereon, each housing having an apertured head on its top and a bushing in its bottom, a sleeve movable longitudinally and rotatively in the head and the bushing and having a collar thereon, bearing balls on the collar, an annular cone supported on the balls, a spring supported on the cone and supporting the head, a pivot-pin extending through the sleeve, an oil-box on the top of the housing about the sleeve, a dust-cap on the top of the sleeve and extending over the oil-box and the upper portion of the housing, and a stub-axle connected to the sleeve and the pivot-pin and also the dust-cap.

3. In a cushioned axle, the combination of an axle-bar, two cylindrical housings on opposite ends of the axle-bar, each housing having screw-threads in its lower end portion and an apertured head fixed in its upper end portion, a bushing inserted in the lower end portion and having a flange thereon extending into contact with said lower end, said bushing having screw-threads thereon engaging the screw-threads of the housing, a stub-axle having two ears, a pivotal element extending movably through said bushing and said head and secured to said ears, said element being seated against the inner or opposed faces of both of said ears, a collar fixed on said pivotal element at a distance from said bushing, and a spring interposed between said collar and said apertured head.

4. In a cushioned axle, the combination of an axle-bar, two cylindrical housings on opposite ends of the axle-bar, each housing having an apertured head on its upper end and a bushing removably secured in its lower end, the bushing having a flange thereon seated against said lower end, a sleeve extending through said bushing and said apertured head and movable longitudinally and rotatively therein, said sleeve having a collar thereon in the housing at a distance from said bushing, a spring interposed between said collar and said apertured head, a stub-axle having an ear extending onto the upper end of said sleeve and an ear extending under the lower end of said sleeve in contact therewith, and a pivot pin extending through said sleeve and the said ears, the pin having a head on one end and a nut on the opposite end thereof rigidly securing said sleeve to both of said ears.

5. In a cushioned axle, the combination of an axle-bar and cylindrical housings thereon, each housing including an apertured head on the upper end thereof, a bushing secured in the lower end of the housing, a stub-axle comprising an ear extending opposite said head and an ear extending opposite said bushing at distances therefrom, a sleeve movable longitudinally and rotatively in said head and in said bushing and extending from the lower one of said ears nearly to the upper one of said ears, said sleeve having a collar thereon above said bushing, a dust-cap seated upon the top of said sleeve in contact with the upper one of said ears and extending over said head, a pivot pin extending through said sleeve and said dust-cap and secured to both of said ears, and a spring extending about said sleeve between said collar and said head.

6. In a cushioned axle, the combination of a stub-axle and two oppositely arranged apertured ears thereon, an axle-bar and a cylindrical housing thereon having an apertured head on the upper end thereof, the housing being between said ears, a bushing secured in the lower end of said housing, a pivoting device extending through said head and said bushing and movably guided therein, said device being fixedly secured to both of said ears, a collar fixed on said device above said bushing, a spring interposed between said collar and said head, an oil-box comprising a top plate extending movably about said device above said head and a flange extending downward and fixedly secured to said head, and packing upon said head within said oil-box.

7. In a cushioned axle, the combination of a stub-axle, a housing, a sleeve extending through and guided in the housing, a pivot pin extending through the sleeve and securind the sleeve to the stub-axle, a collar fixedly secured to said sleeve, bearing balls on said collar, an annular cone on said balls extending about said sleeve, and a spring supported on said cone and supporting said housing.

In testimony whereof, I affix my signature in presence of two witnesses.

EDWARD W. DAVIS.

Witnesses:
P. A. HAVELICK,
E. T. SILVIUS.